(No Model.)
K. LAIMINGER.
HARROW.
No. 490,713. Patented Jan. 31, 1893.
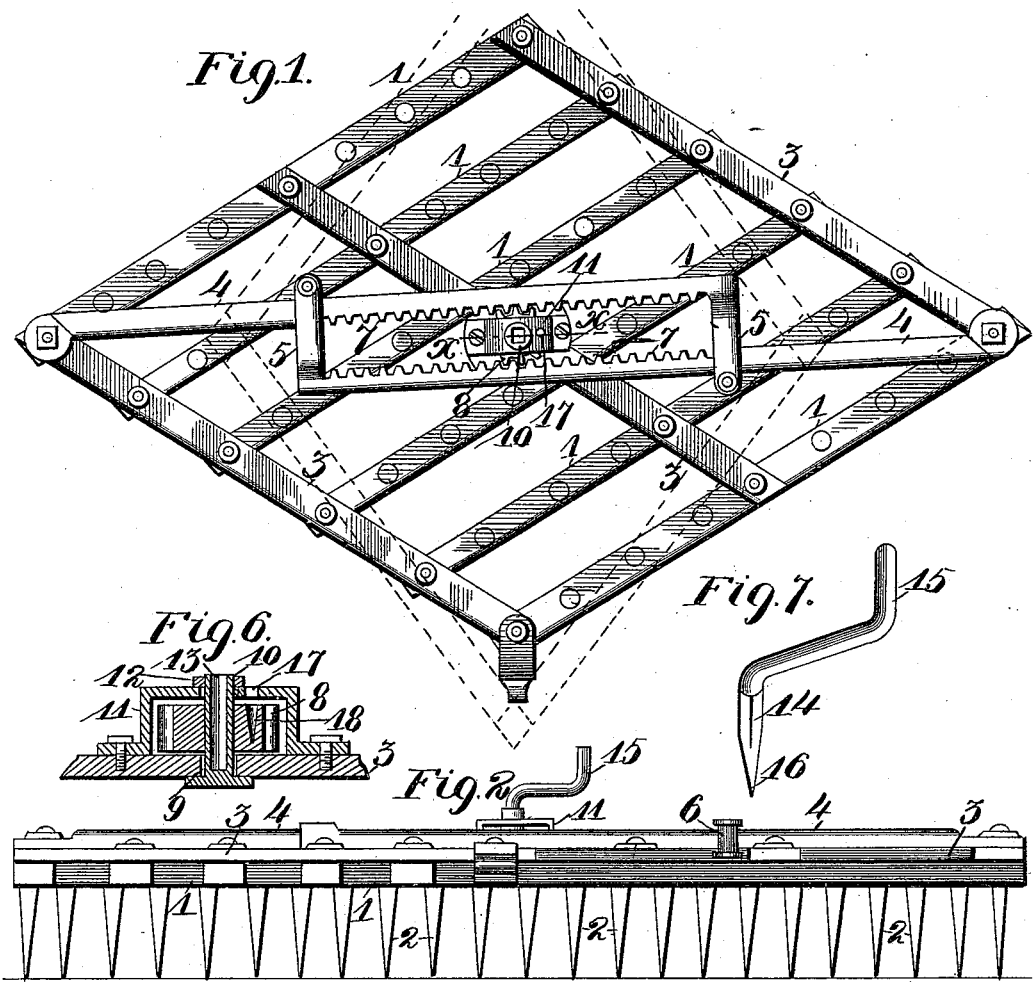
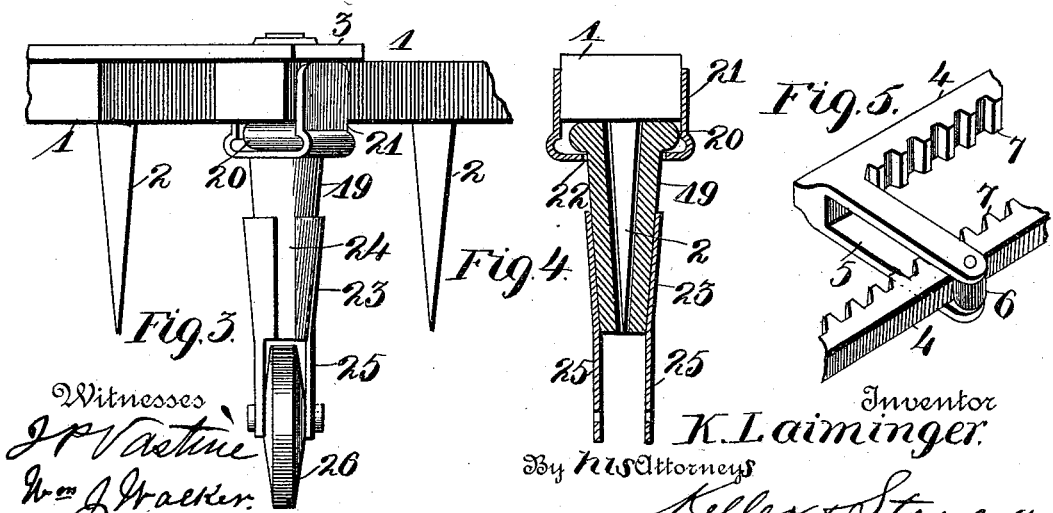
Witnesses
J. P. Vastine
Wm. J. Walker
Inventor
K. Laiminger
By his Attorneys
Keller & Starek

UNITED STATES PATENT OFFICE.

KORBINIAN LAIMINGER, OF ST. LOUIS, MISSOURI.

HARROW.

SPECIFICATION forming part of Letters Patent No. 490,713, dated January 31, 1893.

Application filed September 3, 1892. Serial No. 444,933. (No model.)

*To all whom it may concern:*

Be it known that I, KORBINIAN LAIMINGER, of the city of St. Louis, State of Missouri, have invented certain new and useful Improvements in Harrows, of which the following is a full, clear, and exact description, reference being had to the accompanying drawings, forming a part hereof.

My invention relates to improvements in harrows and consists in the novel arrangement and combination of parts more specifically set forth in the specification and brought out in the claims.

In the drawings Figure 1 is a top plan view of my invention; Fig. 2 is a front elevation of the same; Fig. 3 is a side elevation of one end of the harrow having a removable wheel attached to one of its teeth; Fig. 4 is a vertical section of the socket to which the wheel is attached showing its application to one of the teeth of the harrow; Fig. 5 is a perspective view with parts broken away showing more clearly the rack bars and the manner in which the same are movably united; Fig. 6 is a vertical section taken on the line $x$—$x$ Fig. 1 but somewhat enlarged showing the pinion for operating the rack bars and means for holding the same to the harrow; and Fig. 7 is a perspective view of the operating handle or crank for rotating the pinion and locking the same against movement after adjustment is had.

The object of my invention is to construct a harrow that may be adjusted to harrow paths of various widths according to circumstances, the construction will be hereinafter more fully described.

Referring to the drawings, 1 represents a series of bars of suitable length which are arranged at a predetermined distance apart and to the under surfaces of which are attached in any mechanical manner teeth 2 of well known construction the ends of which are brought in contact with the clods of earth to be broken up.

3 represents three transverse pieces which are movably attached to the upper surfaces of the bars 1 in a manner as best shown in Fig. 1 which, while they connect the said bars 1 they allow the same to move parallel to one another. By uniting the bars 1 by the pieces 3 in the manner above stated the harrow can be made wide or narrow as necessity demands by operating the mechanism hereinafter to be described.

4 represents two arms one end of which is movably attached to the opposite corners of the harrow and are arranged parallel to one another and adapted to be moved in opposite directions always maintaining however a parallel position. The opposite ends of the said arms are bent or formed approximately at right angles to said bars and are forked as shown at 5 for the passage of the adjacent arm, and which forked ends form a guide therefor.

6 represents rollers which are fixed in the forks 5 against which the arms 4 press in their longitudinal movement and hold the arms in their parallel position. The adjacent inner surfaces of the said arms are provided with teeth 7 which mesh with the teeth formed on the pinion 8 which pinion when turned causes the bars to be moved and adjust the harrow to any suitable width. The center transverse piece 3 is provided with a vertical opening 9 through which a shaft 10 passes and keyed to said shaft above said piece is the pinion 8. In order to hold the said shaft in its proper position I employ a metallic keeper 11 through which the upper end of the said shaft also passes and is fastened to the said transverse piece in any mechanical manner.

12 represents a nut which is screwed on the said shaft above the keeper 11 which holds the said shaft in place as best shown in Fig. 6. The said shaft 10 is provided with a square cavity 13 which is adapted to receive the square portion 14 of the crank 15, said crank being employed in the manner shown in Fig. 2 when it is desired to adjust the harrow to a certain width. The end of the crank adjacent to the square portion 14 of the same is pointed as shown at 16 and is adapted to be inserted through the opening 17 formed in the keeper 11 and into the cavity 18 formed in the pinion 8 for locking the said pinion against movement after the harrow has been once adjusted.

In Figs. 3 and 4 I have shown a wheel attachment which may be employed at each corner of the harrow which is convenient in many instances of the construction which I shall now proceed to describe. 19 represents a socket which is circular in cross section and is made to receive snugly one of the teeth of the harrow in a manner as clearly shown in Fig. 4. The upper portion of the said socket is somewhat enlarged as shown at 20 forming a head for the same and which is interposed between the lower surface of the harrow and the metallic clamp 21. The said clamp is made of spring metal and of a single piece and is adapted to clamp the opposite sides of the bars 1 thus preventing the socket from releasing its position from the harrow. The said clamp is provided with a circular opening 22 through which the socket passes and allows the same to be turned independently of the said clamp. 23 represents a metallic socket which is adapted to receive the lower end of the socket 19 said socket being split as shown at 24 forming a clamp. 25 represents two extensions which are formed with the socket 23 between which a wheel 26 is located and movably attached in any well known manner to the said extension. It will thus be seen that the said wheels may be easily removed and the tooth which has previously supported the same be freed.

From the above description the operation of the device is obvious.

Having fully described my invention what I claim is,

1. A harrow consisting of bars carrying teeth, transverse pieces movably secured to said bars, arms movably attached to the opposite corners of said harrow, teeth formed on the said arms, and a pinion movably fixed to one of the transverse pieces, the teeth of which mesh with the said teeth formed on the arms, substantially as described.

2. A harrow consisting of parallel bars and transverse pieces movably connected, arms 4 attached to the opposite corners of the harrow, one end of said arms being bent at right angles and forked, said forked ends co-operating with said arms and forming guides for the same, teeth formed on the said arms, and a pinion fixed to the harrow the teeth of which mesh with the teeth formed on the said arms, substantially as described.

3. A harrow consisting of parallel bars and transverse pieces movably connected, a keeper 11 fixed to one of said transverse pieces, a shaft passed through said transverse piece and keeper, a pinion keyed to the said shaft, arms 4 attached to the opposite corners of the harrow having teeth along their inner edges, means for holding said arms in proximity with one another, a crank 15 one end of which is adapted to be inserted into the cavity 13 formed in said shaft for turning said pinion, and a pointed end 16 formed on said crank and adapted to be passed through the opening 17 and cavity 18 formed in the keeper and pinion respectively, for locking the pinion against movement, substantially as described.

4. A harrow having a removable socket 19 attached to and supported by one of its teeth, a clamp carried by said socket for holding the said socket in place, a metallic socket 23 adapted to receive the first mentioned socket having extensions 25, and a wheel 26 located between said extensions, substantially as described.

In testimony whereof I affix my signature in the presence of two witnesses.

KORBINIAN LAIMINGER.

Witnesses:
D. IND. NEUDORF,
EMIL STAREK.